Aug. 30, 1955  R. D. PHARES  2,716,350
SLOW SPEED CONVERTER MOTOR DRIVE
Filed June 5, 1953  5 Sheets-Sheet 1

INVENTOR.
Robert D. Phares
BY
Willard S. Grout
ATTORNEY

Aug. 30, 1955    R. D. PHARES    2,716,350
SLOW SPEED CONVERTER MOTOR DRIVE
Filed June 5, 1953    5 Sheets-Sheet 2

INVENTOR.
Robert D. Phares
BY
Willard S. Grow
ATTORNEY

Aug. 30, 1955 R. D. PHARES 2,716,350
SLOW SPEED CONVERTER MOTOR DRIVE
Filed June 5, 1953 5 Sheets-Sheet 3

INVENTOR.
Robert D. Phares
BY
Willard S. Grow
ATTORNEY

Aug. 30, 1955  R. D. PHARES  2,716,350
SLOW SPEED CONVERTER MOTOR DRIVE
Filed June 5, 1953  5 Sheets-Sheet 4

INVENTOR.
Robert D. Phares
BY
Willard S. Grow
ATTORNEY

Aug. 30, 1955 R. D. PHARES 2,716,350
SLOW SPEED CONVERTER MOTOR DRIVE
Filed June 5, 1953 5 Sheets-Sheet 5

INVENTOR.
Robert D. Phares
BY
Willard S. Gow
ATTORNEY

United States Patent Office 2,716,350
Patented Aug. 30, 1955

2,716,350

SLOW SPEED CONVERTER MOTOR DRIVE

Robert D. Phares, Phoenix, Ariz., assignor to Savage Manufacturing Company, Phoenix, Ariz.

Application June 5, 1953, Serial No. 359,837

7 Claims. (Cl. 74—217)

This invention pertains to improvements in a slow speed converter motor drive applicable to electric drive motors for machine tools and other devices.

One of the objects of this invention is to provide an improved slow speed converter motor drive which is easy to install and requires a minimum of effort and skill to place the apparatus in operation.

Still another object of this invention is to provide a slow speed converter motor drive for an electric drive motor which may be installed without any special machining or special brackets or fixtures or modification of the motor or machine driven thereby.

Still another object of this invention is to provide an improved slow speed converter motor drive mounted on the drive shaft of the motor and supported by torque arms connectable to the mounting supports for the motor on a machine structure or the like.

A still further object of this invention is to provide an improved slow speed converter motor drive which may be readily shifted manually from a low speed drive to a high speed drive or vice versa without any special apparatus or skill being required upon the part of the operator of the machine driven by the motor.

Still another object of this invention is to provide a compact, simple, powerful and efficient slow speed converter motor drive applicable to any standard electric drive motor or other motive power transmission for actuating a machine or the like at different rates of speed.

Further features and advantages of this invention will appear from the detailed description of the drawings in which.

Figure 1:
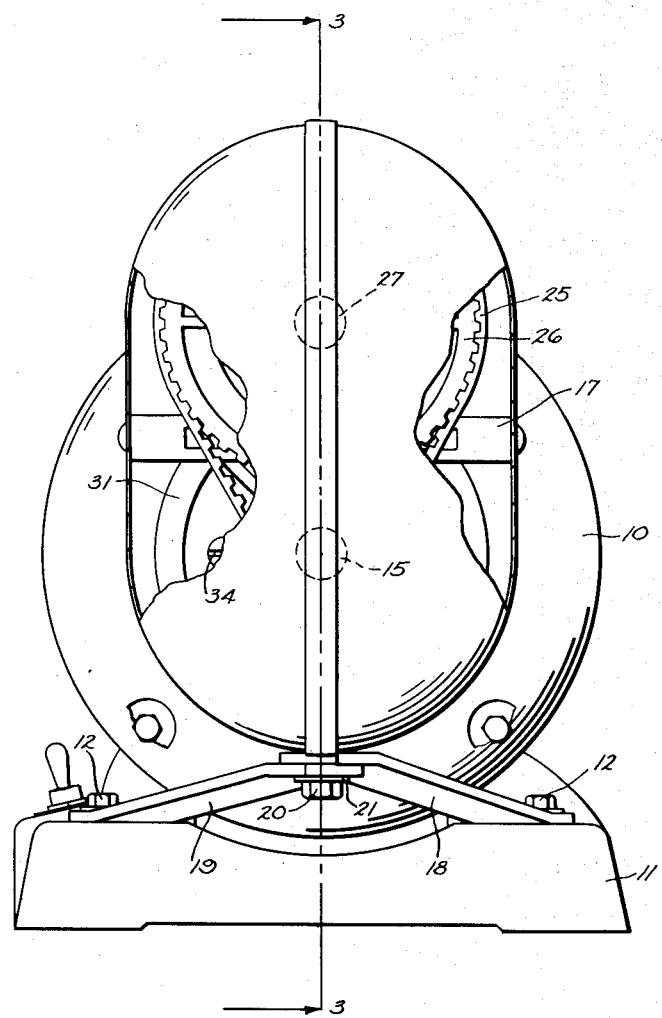
Fig. 1 is a front view of a slow speed converter motor drive incorporating the features of this invention.

As illustrative of one embodiment of this invention there is shown a drive motor 10 having the base 11 which is secured to the machine frame or structure by the usual mounting bolts 12. The motor 10 has the output drive shaft 13 to which is fixed the main shaft 14 of the slow speed converter motor drive unit.

Figures 3, 10:
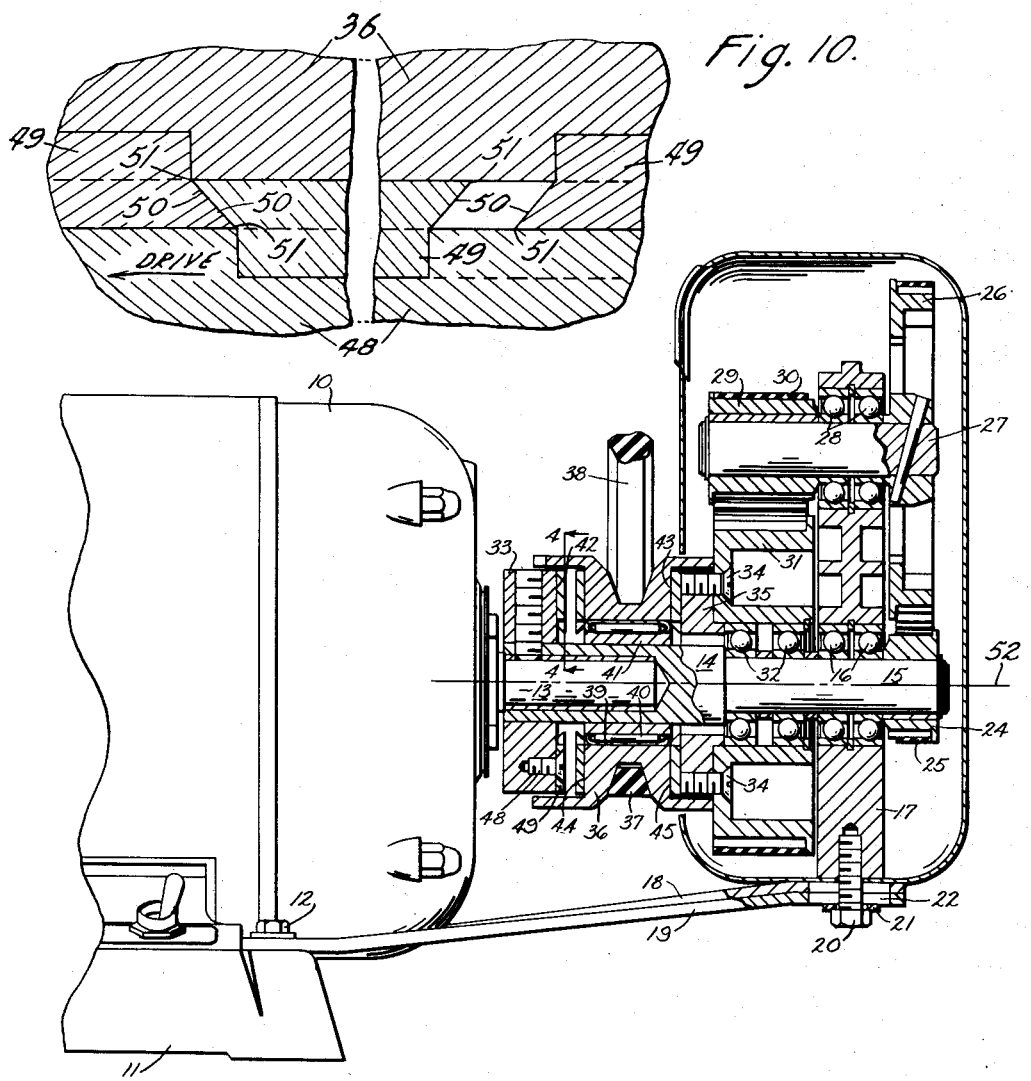
Fig. 3 is a section on the line 3—3 of Figs. 1 and 2.
Fig. 10 shows the clutch members in engaged driving position.
Figure 6:
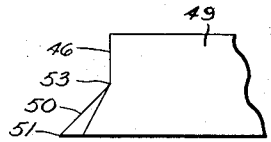
Fig. 6 is a fragmentary view indicated by the line 6—6 in Fig. 4.

The shaft 14 has a reduced outer end portion 15 upon which is carried the bearings 16 which in turn provide a journal support for the support casting 17 on the shaft 14 which is held against rotation by a pair of torque arms 18 and 19 which are connected at their outer ends by a bolt 20 and washer 21, the bolt 20 passing through elongated slots 22 and threadedly into the support casting 17 as best seen in Fig. 3. The inner ends of the torque arms 18 and 19 have holes 23 through which pass the mounting bolts 12 for the motor 10 so as to provide a triangular torque support between the bolts 12 and the bolt 20 of rigid positive construction so as to firmly and definitely hold the support casting 17 in position on the shaft 14 at all times.

On the outer end of 15 of the shaft 14 is fixed the first cog pulley 24 over which operates the cog or timing belt 25 which then operates over the second cog pulley 26 fixed to the secondary shaft 27 journaled on the bearings 28 supported in the outer end of the support casting 17.

On the inner end of the secondary shaft 27 is fixed the third cog pulley 29 over which operates the second but wider cog or timing belt 30 which in turn operatively passes over the last cog pulley 31. The last cog pulley 31 is supported on a pair of bearings 32 supported on the portion 15 of the shaft 14 as best seen in Fig. 3 so that the last cog pulley is free to rotate relative to the shaft 14 around an axis coincident with the shaft 14 and the motor shaft 13.

Fixed to the main shaft 14 and thus to the output drive shaft 13 of the motor 10 is the high speed drive plate 33 while fixed to the last cog pulley 31 by suitable screws 34 is the low speed drive plate 35. Between the high speed drive plate 33 and the low speed drive plate 35 is the output drive pulley 36 having the usual V-groove 37 in which operates the V-belt 38 connected to the apparatus to be driven from the motor 10 at the desired high and low speed. Fixed in the bore of the output drive pulley 36 is a needle bearing having the outer race 39 and the needle bearings 40 held in the outer race and cage 39. The needle bearings 40 revolve on and are axially slidable on the inner race member 41 suitably fixed to the main shaft 14.

Figure 9:
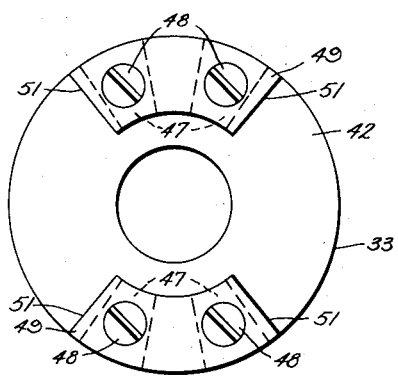
Fig. 9 is a face view of a drive plate showing the lock and drive inserts of Figs. 4 and 7 in place.

On the face 42 of the high speed drive plate 33, the face 43 of the low speed drive plate 35 and on each of the side faces 44 and 45 of the output drive pulley 36 are the segmental lock-in and drive inserts shown best in Figs. 4 through 9. In Fig. 9 is shown a pair of segmental lock-in and drive inserts on the face 42 of the high speed drive plate 33. The radially disposed edges 46 fit securely in mating slots 47 in the respective high speed drive plate 33, low speed drive plate 35 and the faces on the output drive pulley 36 so as to be rigidly secured in place when appropriate screws 48 are put in place.

Figure 4:
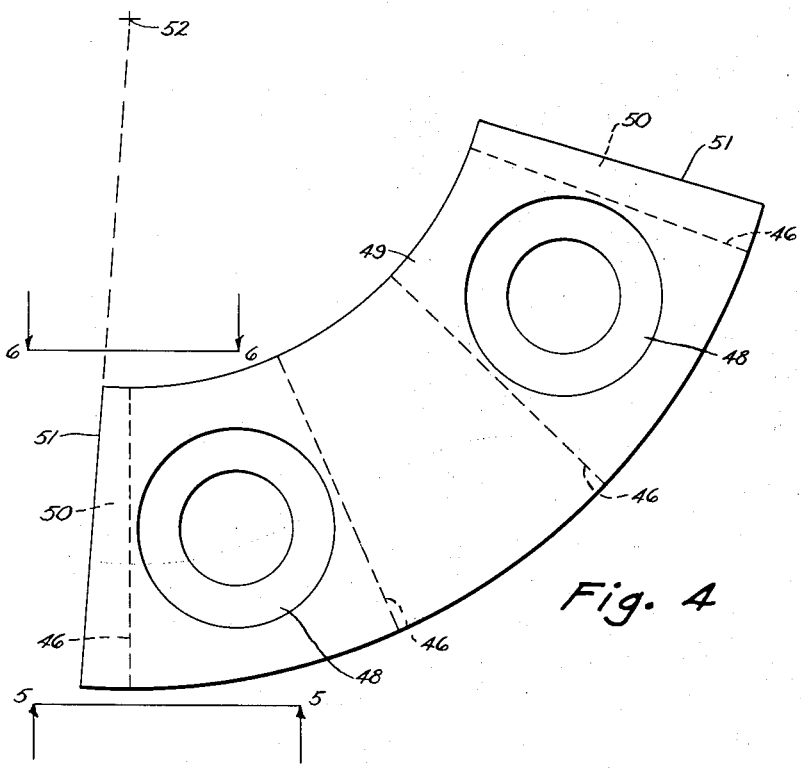
Fig. 4 is a section on the line 4—4 of Fig. 3.
Figure 5:
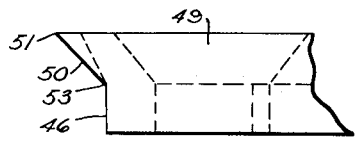
Fig. 5 is a fragmentary view indicated by the line 5—5 in Fig. 4.
Figure 7:
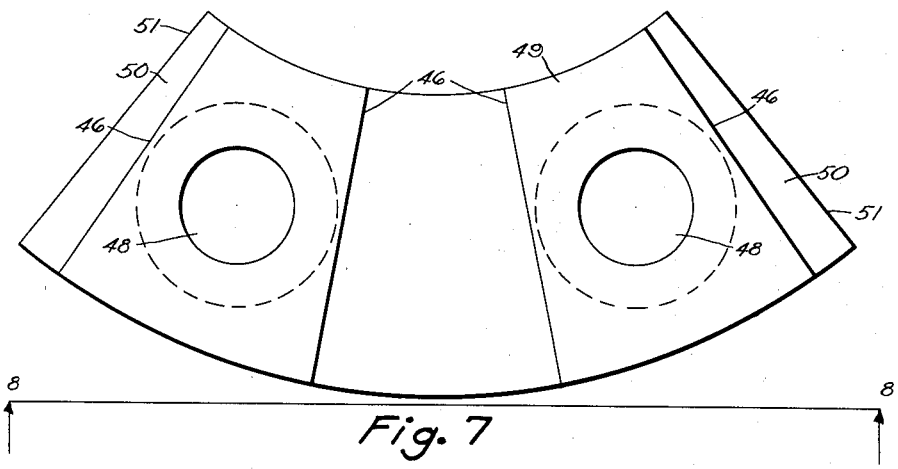
Fig. 7 is a rear view of the lock and drive insert shown in Fig. 4.
Figure 8:
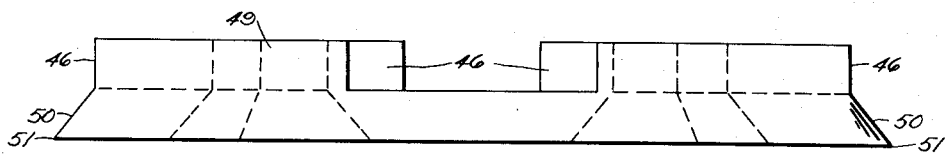
Fig. 8 is a peripheral view indicated by the line 8—8 in Fig. 7.

The edges of each of the segments or lock-in and drive inserts 49 are formed in a special way in that inwardly facing angularly disposed surfaces 50 are provided in such a manner that the sharp outer edge 51 is disposed exactly radially of the axis of rotation 52 of the segments or lock-in and drive inserts about the shaft 13 of the motor 10 and of course this same axis 13 of the shaft 14. The lower edge of the angularly disposed surface indicated at 53 is also positioned exactly radially of the axis 52. The surface 50 is therefore a variable surface defined by these two carefully positioned edges 51 and 53 as best seen in Figs. 4 and 5. All of the lock-in an drive inserts 49 are constructed identical and therefore abut in firm full surface contact with one another as the pulley 36 is manually slid axially of the shaft 14 when shifting from the high speed drive of inner connection of the high speed drive plate 33 with the pulley 36 or with the low speed drive from the low speed drive plate 35 to the output drive pulley 36. The axial shifting of pulley may be easily done by manually exerting side pressure on the belt 38 when the motor 10 is de-energized.

Figure 2:
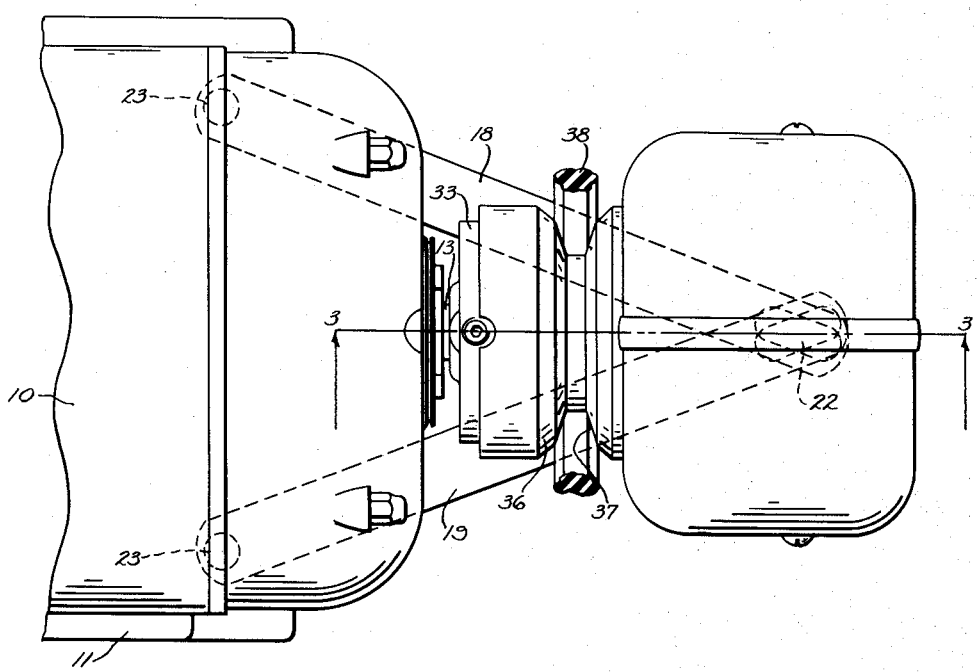
Fig. 2 is a plan view of the slow speed converter motor drive shown in Fig. 1.

It is important to note certain significant features of these arrangements in that the position of the inner locking surfaces 50 are such that whenever the pulley 36 is shifted to one or the other of its drive positions just above mentioned, the lock-in and drive inserts 49 will innerlock and hold in driving relationship at all times with motor 10 energized until power is disconnected from the motor 10 and the pulley shifted to the other drive position. The torque reaction between the motor 10 and load on the belt 38 keeps the clutch members engaged when the motor is energized, Fig. 10. It is further important to note that in this novel drive arrangement of a high speed drive directly from the motor shaft through the high speed drive plate 33 or through the reduction gearing from the pulleys 24—46 and 29—31 as described to the slow speed drive plate 35, the belt 38 remains substantially in its normal driving position over the motor shaft 13 of the drive motor 10. It is also to be noted that only a slight manual axis shift of the belt as recited above is required to affect the low and high speed drive power take-offs for the converter motor drive unit. Also, it is significant to note that no special machining, fitting or other skilled craftsmanship is required to install the unit since its essential mounting points are the motor shaft 13 itself and the mounting bolts at the front or shaft end of the motor marked at 12 which provide the sole and standardized means by which to mount the unit on the drive motor. Thus, we have a highly efficient unit simple to install and which does not require any change in the machine structure to which it is applied. Belt drives already on the machine structures are in nowise affected and no drilling or special fitting of the machine frame is required since the bolts 12 are normally provided anyway for the motor structure and are utilized for the torque arms in the triangular set-up particularly shown in Fig. 2 to effected the proper positioning and support of the unit on the motor shaft 13 under all conditions of operations and installations. The elongated slotted openings 22 in the outer ends of the torque arms 18 and 19 provide for any minor variations in the position of the motor shaft on various different types and sizes of motors to which the unit is applicable.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a slow speed converter drive having a drive motor, an output drive shaft from said motor, a base on said motor, and mounting bolts for securing said base to a machine frame, a slow speed converter unit including a main power input shaft rigidly mounted on said output drive shaft of said motor, a speed reduction unit journaled on and driven from said main power input shaft, and an output pulley journaled on said main power input shaft arranged to be axially shifted for driving engagement either with said output drive shaft of said motor or with said speed reduction unit.

2. In a slow speed converter drive having a drive motor, an output drive shaft from said motor, a base on said motor, and mounting bolts for securing said base to a machine frame, a slow speed converter unit including a main power input shaft rigidly mounted on said output drive shaft of said motor, a speed reduction unit journaled on and driven from said main power input shaft, an output pulley journaled on said main power input shaft arranged to be axially shifted for driving engagement either with said output drive shaft of said motor or with said speed reduction unit, and torque arm means to secure said speed reduction unit against rotation on said main power input shaft.

3. In a slow speed converter drive having a drive motor, an output drive shaft from said motor, a base on said motor, and mounting bolts for securing said base to a machine frame, a slow speed converter unit including a main power input shaft rigidly mounted on said output drive shaft of said motor, a speed reduction unit journaled on and driven from said main power input shaft, an output pulley journaled on said main power input shaft arranged to be axially shifted for driving engagement either with said output drive shaft of said motor or with said speed reduction unit, and a torque arm means to secure said speed reduction unit against rotation on said main power input shaft comprising a pair of torque arms having their inner ends secured to the mounting bolts for said motor base and having a common securing bolt in said speed reduction unit passing through elongated holes in the outer ends of both of said torque arms.

4. In a slow speed converter drive having a drive motor, an output drive shaft from said motor, a base on said motor, and mounting bolts for securing said base to a machine frame, a slow speed converter unit including a main power input shaft rigidly mounted on said output drive shaft of said motor, a speed reduction unit journaled on and driven from said main power input shaft, an output pulley journaled on said main power input shaft arranged to be axially shifted for driving engagement either with said output drive shaft of said motor or with said speed reduction unit, and lock-in and drive inserts on said pulley, main power input shaft, and speed reduction unit to hold said pulley in either of said axially shifted positions when said drive motor is energized to apply driving power to said pulley.

5. In a slow speed converter drive having a drive motor, an output drive shaft from said motor, a base on said motor, and mounting bolts for securing said base to a machine frame, a slow speed converter unit including a main power input shaft rigidly mounted on said output drive shaft of said motor, a speed reduction unit journaled on and driven from said main power input shaft, an output pulley journaled on said main power input shaft arranged to be axially shifted for driving engagement either with said output drive shaft of said motor or with said speed reduction unit, and lock-in and drive inserts on said pulley, main power input shaft and speed reduction unit to hold said pulley in either of said axially shifted positions when said drive motor is energized to apply driving power to said pulley, said lock-in and drive inserts including radial surfaces angularly disposed relative to the axis of rotation of said shafts defined by angularly displaced edges lying on radii from said axis of rotation.

6. In a slow speed converter for a drive motor having an output drive shaft, a base, and mounting bolts to secure said drive motor to a supporting frame, a converter unit including a main shaft fixed on said motor output drive shaft, a support casting journaled on said main shaft, a pair of triangularly disposed torque arms, elongated holes in the outer ends of said arms, a common bolt passing through said elongated holes and secured in said support casting, and means for securing the other ends of said torque arms to said mounting bolts for said drive motor.

7. In a slow speed converter for a drive motor having an output drive shaft, a base, and mounting bolts to secure said drive motor to a supporting frame, a converter unit including a main shaft fixed on said motor output drive shaft, a support casting journaled on said main shaft, a pair of triangularly disposed torque arms, elongated holes in the outer ends of said arms, a common bolt passing through said elongated holes and secured in said support casting, means for securing the other ends of said torque arms to said mounting bolts for said drive motor, a first cog pulley fixed to said main shaft, a second shaft radially spaced from said main shaft journaled in said support casting, a second cog pulley fixed on said second shaft, a timing belt operating over said first and second cog pulleys, a third cog pulley fixed on said second shaft, a last cog pulley journaled on said main shaft, a second timing belt operating over said third and last cog pulleys, a high speed drive plate fixed to said main shaft, a low speed drive plate fixed to said last cog pulley, an output V-belt pulley journaled and axially slidable in said main shaft between said high and low speed drive plates, lock-in and drive inserts fixed to both of said high and low speed drive plates, and mating lock-in and drive inserts on each side of said V-belt pulley.

References Cited in the file of this patent

UNITED STATES PATENTS

| Number | Name | Date |
|---|---|---|
| 377,281 | Welch | Jan. 31, 1888 |
| 1,983,827 | Winther et al. | Dec. 11, 1934 |
| 2,453,957 | Allen | Nov. 16, 1948 |
| 2,574,778 | Dunn | Nov. 13, 1951 |
| 2,641,137 | Orcutt et al. | June 9, 1953 |